2,996,498
THERMOPLASTIC STARCH ETHERS SOLUBLE IN WATER AND IN ALCOHOL
Wadym Jarowenko, Plainfield, N.J., assignor to National Starch and Chemical Corporation
No Drawing. Filed Jan. 5, 1959, Ser. No. 784,892
11 Claims. (Cl. 260—233.3)

This invention relates to a method for the production of a new type of starch derivative, and to the resulting product. More particularly, this invention relates to a method for producing starch ethers possessing novel properties not heretofore associated with starches.

It is the prime object of this invention to provide a starch derivative which is dispersible in alcohol as well as in water to form colloidal solutions, and which in addition is also thermoplastic. Another object is to produce such derivatives by a relatively simple, quick and economical process, without the need for high pressures or temperatures.

It is known, of course, that ordinary untreated starch may be dispersed in water by mere heating. Such heating causes the starch granules to expand and then to disintegrate, forming a hydrated colloidal dispersion (sometimes referred to as a "solution"). Untreated starch is not soluble in alcohol (as for example ethanol, isopropanol, etc.), nor is it thermoplastic in the sense of becoming sticky and adhesive upon heating. It is further known that starch can be chemically treated so that it becomes alcohol-dispersible and thermoplastic, as in the case of very highly acetylated starches, but such derivatives can no longer be dispersed in water. In other words, alcohol dispersibility and thermoplasticity has heretofore been achieved at the cost of loss of water dispersibility.

When starches, dextrines and similar amylaceous materials are used as adhesives for envelopes, labels, gummed tapes, bags and the like, it is almost invariably in the form of their aqueous dispersions. In many cases it would be desirable to use the starch adhesive in the form of a solution in a volatile solvent, since this would permit more rapid drying of the adhesive after application, with consequent increase in production speeds. Solvent dispersions would also allow the use of starches in spray coating operations, a field in which they have heretofore been decidedly limited.

Thermoplastic synthetic resins are used extensively for heat sealing operations. Surfaces coated with such resins and dried, can subsequently be adhered by mere application of heat and pressure. A thermoplastic starch adhesive, being considerably less costly, would be extremely valuable as an adhesive and coating.

Having the three properties, i.e. water-solubility, alcohol-solubility and thermoplasticity in one starch product offers obvious advantages. Thus, the practitioner might decide to apply the adhesive composition to a paper surface from an alcohol solution. Then, when the need arises to adhere this coated surface to some other object, it can be done by moistening the coating with water, or by heating, or by applying an appropriate organic solvent, whichever is more suitable under the particular circumstances.

I have now discovered that starch derivatives having the unique combination of water-solubility, alcohol-solubility and thermoplasticity can be made by reacting starch, under the conditions to be described, with at least 100%, based on the weight of the starch, of an aliphatic alkylene oxide having from 2 to 5 carbon atoms. In place of these alkylene oxides, I may also use their aliphatic alkoxy derivatives.

Although the reaction of starch with alkylene oxides has previously been proposed, such prior known processes did not result in a starch having the unique combination of properties herein described. The special combination of proportions and reaction conditions of my invention for the first time makes possible the production of water and alcohol soluble, thermoplastic starches by treatment with alkylene oxides, in an economical process without the need for superatmospheric pressures or excessive reaction periods.

When I speak herein of starch, I include in that term starch derived from any vegetable source (e.g. corn, wheat, tapioca, potato, waxy maize, etc.) as well as starch derivatives such as dextrines, hydrolized and oxidized starches or other chemically treated starches which still retain their essentially amylaceous nature and possess a sufficient number of reactive hydroxyl groups to be able to participate in the reaction of this invention. Thus, dextrines which are ordinarily dispersible only in water but not in organic solvents, may be converted by my process into products which are soluble in alcohol as well as in water, and thermoplastic as well.

Before describing my invention in detail, it may be helpful to point out that when the term "soluble" or "solution" is used in this specification and in the claims, it does not necessarily refer to a true solution in the purely technical sense. It has already been pointed out that when a starch is dispersed in water, as by cooking, it forms a homogeneous hydrated colloidal dispersion rather than a true solution. Nevertheless this colloidal solution is stable, cannot be readily filtered and is recognizably distinct from a mere suspension of raw starch in water, wherein the starch quickly settles to the bottom like so many grains of sand. Similarly, although the derivative of my invention may not always form a true solution or lacquer, it does form a stable and homogeneous colloidal solution without the immediate settling that would be obtained, for example, by mixing raw starch with isopropanol or water. The colloidal solutions, whether in water or organic solvents, cannot readily be separated by filtration.

I have discovered that starch derivatives having the unique combination of water solubility, alcohol solubility and thermoplasticity, may be made by suspending starch in a mixture of water and a polar organic solvent (such as a low molecular weight aliphatic secondary or tertiary alcohol, or a cyclic ether such as dioxane), and reacting the thus suspended starch with at least 100%, based on the weight of the starch, of an aliphatic alkylene oxide having from 2 to 5 carbon atoms (or an aliphatic alkoxy derivative thereof), in the presence of a strongly alkaline catalyst, preferably together with a free radical initiating catalyst. The reaction proceeds at temperatures from 30° to 90° C., and at ordinary atmospheric pressures.

It will be noted that I speak of a "mixture" of water and a polar solvent, as the reaction medium. This means that the reaction can take place with the starch suspended in water, provided the water contains at least a small amount of alcohol or other suitable polar solvent. Conversely it can take place with the starch suspended in, say, isopropanol, provided that the isopropanol contains at least a small amount of water. This water may be added as an extraneous component, or it may be present as a part of the ingredients already present. Thus, commercial isopropanol contains about 9% of water; starch also normally contains a certain amount of moisture, varying with the different starch types. The water thus present may be sufficient, in an alcoholic medium, to provide the moisture which is essential for the reaction of my invention. In any case, it is seen that the reaction medium is a mixture of water and polar solvent.

It has also been noted that besides the conventional strongly alkaline catalyst, my process is aided by the presence of a free radical initiating catalyst. Free radical initiating catalysts are well known in the art of vinyl polymerization, and include the azo types, the persulfates and the peroxides. It was a surprising and entirely unpredicted discovery, however, that these vinyl polymerization catalysts would have a remarkable effect in the starch etherification process of the present invention, vastly speeding the reaction and resulting in a starch derivative having the unique combination of properties already described.

The various ingredients of the reaction mass will now be described in greater detail.

As the alkylene oxide, I prefer ethylene oxide or propylene oxide, although other aliphatic alkylene oxides having from 2 to 5 carbon atoms may be employed, as may their aliphatic alkoxy derivatives. Thus, one may use butadiene monoxide and 3-allyloxy-1,2 epoxypropane.

As for the free radical initiating catalyst, it has been pointed out that this is a well known class (although for a different, non-analogous art). Examples of such catalysts include hydrogen peroxide, benzoyl peroxide, potassium persulfate and azo-bis-isobutyronitrile.

Examples of the alkaline catalysts include the alkali metal hydroxides, triethylamine, pyridine, or quaternary ammonium bases such as tetramethyl ammonium hydroxide.

As the polar solvent, I prefer isopropanol, although other low molecular weight secondary or tertiary alcohols may be used, such as tertiary butyl alcohol or tertiary isobutyl alcohol; also cyclic ethers such as dioxane. Mixtures of such alcohols with aromatic solvents may also be used, if desired, as for example a 1.0:0.75 mixture of isopropanol and toluene. Remembering that the reaction begins with the starch suspended in a liquid, and that at the end of the reaction it is to be completely dispersed as a colloidal solution in that same liquid medium, it follows that the liquid medium, be it water or polar solvent, must be one in which the starch derivative is dispersible to form at least a colloidal solution.

The procedure in my process is simple, and the reaction relatively rapid. Preferably, I first add the liquid carrier medium to a reaction vessel equipped with a reflux condenser. To this is added the alkaline catalyst, followed by the starch. The alkylene oxide is then added. The mixture is heated, and when the reflux temperature of the alkylene oxide is reached, the free radical initiating catalyst is added, and heating continued until reflux of the alkylene oxide ceases, indicating that the oxide has been consumed and the reaction is complete. The temperature employed in the heating will vary with the particular alkylene oxide used, and the period required for completion of the reaction depends upon a number of variables, including the type of starch used, the nature of the liquid carrier medium, the catalyst system, and the particular oxide employed.

Upon completion of the reaction, the starch derivative exists in the form of a homogeneous, colloidal solution in the carrier liquid (i.e. water or polar solvent). The solution may be brought to a neutral pH, if desired, by neutralization with acid. The solution may be stored and used as such, or it may be dried by any suitable drying means, as for example by spray drying or by forced draft oven drying. In such cases the resulting product is a dry powder, which may be dissolved either in water or in alcohol (or other suitable organic solvent).

With reference to proportions of the various ingredients, the amount of liquid medium in which the starch is suspended is not critical, and may vary from about 1 to 7 parts by weight, per part of starch. If the major liquid medium is alcohol (or other polar solvent) it should contain at least 10% and preferably from 20% to 50% of water, based on the dry weight of the starch. If the medium is water, it should contain from 5% to 50% of the alcohol (such as isopropanol or other suitable polar solvent), based on the dry weight of the starch. In either case one has a water-solvent mixture as the carrier medium. As already stated, the water may be added to the reaction mass, or it may be present as an inherent part of one of the ingredients (e.g. moisture in the starch, water in commercial isopropanol, etc.).

The alkaline catalyst should be present in an amount ranging from at least 2% (calculated as NaOH) up to about 12% or higher, these figures being based on the dry weight of the starch. If alkaline bases other than NaOH are used, proportionately higher amounts are required, to achieve equivalent alkalinity. While still higher amounts may be used, they are not desirable, and serve no useful purpose. The free radical initiating catalyst is used in an amount of at least 0.05%, based on the dry starch weight. Here too, there is no critical upper limit, and amounts as high as 3.2% and more have been employed. As the amount of free radical catalyst is increased, there is sometimes danger of oxidative degradation of the starch, but in some circumstances a certain degree of starch degradation may be desirable.

The alkylene oxide should be used in an amount of at least 100%, based on the dry weight of the starch. Substantially lesser amounts will not achieve alcohol solubility and thermoplasticity in the starch derivative. There is no critical upper limit to the amount of alkylene oxide which may be used, although I have found it to be unnecessary, ordinarily, to employ more than 250%, based on the starch weight.

When making the product in a substantially alcoholic carrier medium, with a minor amount of water present, the final solution of the starch derivative will naturally still contain the water. Although for many applications the solution may be used as such, it may be found desirable in some instances to have the solution substantially free of water. The water may be removed by azeotropic distillation, and since such distillation removes some of the alcohol (or other solvent) fresh alcohol may be added as a replacement.

The following examples will further illustrate the embodiment of my invention.

*Example 1*

This example illustrates the preparation of our starch derivative in the form of an alcohol dispersion.

Into a reaction vessel equipped with a reflux condenser were placed 16.7 parts of water, 6 parts of sodium hydroxide and 150 parts of commercial isopropanol. There were then added 100 parts of a waxy maize starch which had been acid converted to a degree known in the trade as 85 fluidity. This was followed by the addition of 100 parts of propylene oxide. Heating was begun, and when the reaction mass had reached a temperature (about 45° C.) where reflux was initiated, there were added 0.3 part of hydrogen peroxide. During the next 7 hours the temperature gradually rose to 75° C., at which temperature refluxing ceased, indicating that the reaction was complete. Heating was discontinued, and the reaction mass was neutralized by the addition of approximately 9 parts of glacial acetic acid.

Although not essential, it was desired in this case that the product contain no excess water. Therefore the water was removed by azeotropic distillation, and replaced with fresh isopropanol.

The product was a stable solution, which did not precipitate when additional alcohol was added. When portions of the material were coated upon paper strips and allowed to dry, it was found that they could be adhesively reactivated either by moistening with water or by heating at a temperature of about 120–160° C.

In a variation of the above example, the entire procedure was repeated, except that the hydrogen peroxide (free radical initiating catalyst) was omitted. Although the reaction now required 24 hours for completion, the final product was comparable in its properties to that described above. In still another variation, anhydrous isopropanol was used, no water was added, and no hydrogen peroxide was used; the desired product could not be obtained.

*Example II*

In this example, there was formed a colloidal solution of the starch derivative in water, which was ultimately converted into a dry product.

Following the general procedure described in Example I, 190 parts of water, 10 parts of isopropanol, 3 parts of sodium hydroxide and 100 parts of 85 fluidity waxy maize starch were placed in a reaction vessel, to which was added 100 parts of propylene oxide. Heating was begun, and when reflux commenced, there were added 0.3 part of hydrogen peroxide. The mass was heated for approximately 5½ hours, the temperature reaching 86° C. When reflux ceased, the mass was neutralized by the addition of 4.5 parts acetic acid.

The product was a stable, homogeneous aqueous, colloidal solution, which could be stored as such, and applied to surfaces such as paper, etc., to form water and heat sensitive films. However, as a further variation, the solution was dried in a forced air oven, resulting in a dry starch product. This dry material could then be dispersed readily either in water or in alcohol to form an adhesive with the already described unique combination of properties.

*Examples III through XVI*

For purposes of brevity, the following examples are given merely in terms of the ingredients employed. The working procedure was substantially the same as described in the previous examples. All figures refer to parts by weight.

III

| | |
|---|---|
| Isopropanol (commercial 91%) | 150 |
| Triethylamine | 15.2 |
| White corn dextrine | 100 |
| Propylene oxide | 250 |
| Hydrogen peroxide | 0.05 |

IV

| | |
|---|---|
| Dioxane | 150 |
| Sodium hydroxide | 12 |
| Water | 8 |
| Waxy maize 85 fluidity | 100 |
| Propylene oxide | 100 |
| Hydrogen peroxide | 0.7 |

V

| | |
|---|---|
| Isopropanol (commercial 91%) | 750 |
| Sodium hydroxide | 5 |
| Waxy maize 85 fluidity | 100 |
| 3-allyloxy-1,2-epoxypropane | 197 |
| Hydrogen peroxide | 1.0 |

VI

| | |
|---|---|
| Isopropanol (commercial 91%) | 400 |
| Potassium hydroxide | 8.4 |
| Untreated corn starch | 100 |
| Propylene oxide | 200 |
| Hydrogen peroxide | 0.5 |

VII

| | |
|---|---|
| Isopropanol (commercial 91%) | 600 |
| Sodium hydroxide | 3 |
| Potato starch | 100 |
| Propylene oxide | 100 |
| Hydrogen peroxide | 0.3 |

VIII

| | |
|---|---|
| Isopropanol (commercial 91%) | 484 |
| Sodium hydroxide | 6 |
| Waxy maize 85 fluidity | 100 |
| Butadiene monoxide | 122 |
| Hydrogen peroxide | 3.2 |

IX

| | |
|---|---|
| Isopropanol (commercial 91%) | 150 |
| Sodium hydroxide | 6.0 |
| Waxy maize 85 fluidity | 100 |
| Propylene oxide | 100 |
| Benzoyl peroxide | 0.05 |

X

| | |
|---|---|
| Isobutanol | 400 |
| Water | 13.8 |
| Sodium hydroxide | 6 |
| Waxy maize 85 fluidity | 100 |
| Propylene oxide | 100 |
| Hydrogen peroxide | 0.7 |

XI

| | |
|---|---|
| Isopropanol (commercial 91%) | 150 |
| Triethylamine | 15 |
| Waxy maize 85 fluidity | 100 |
| Propylene oxide | 100 |
| Hydrogen peroxide | 1.0 |

XII

| | |
|---|---|
| Isopropanol (commercial 91%) | 150 |
| Tetramethyl ammonium hydroxide (24% solution in alcohol) | 56 |
| Waxy maize 85 fluidity | 100 |
| Propylene oxide | 100 |
| Hydrogen peroxide | 1.6 |

XIII

| | |
|---|---|
| Isopropanol (commercial 91%) | 290 |
| Lithium hydroxide | 3.6 |
| Waxy maize 85 fluidity | 100 |
| Propylene oxide | 100 |
| Hydrogen peroxide | 0.5 |

XIV

| | |
|---|---|
| Isopropanol (commercial 91%) | 150 |
| Triethylamine | 6 |
| Waxy maize 85 fluidity | 100 |
| Propylene oxide | 100 |
| Azo-bis-isobutyronitrile | 0.1 |

XV

| | |
|---|---|
| Isopropanol (commercial 91%) | 150 |
| Sodium hydroxide | 6 |
| Waxy maize 85 fluidity | 100 |
| Propylene oxide | 100 |
| Potassium persulfate | 0.1 |

XVI[1]

| | |
|---|---|
| Isopropanol (commercial 91%) | 150 |
| Sodium hydroxide | 12 |
| Water | 16 |
| Waxy maize 85 fluidity | 100 |
| Ethylene oxide | 104 |
| Hydrogen peroxide | 0.5 |

[1] In this example a condenser cooled with ice water was used, to prevent escape of the ethylene oxide gas.

In the above examples, where isopropanol was used, it was in the form of the commercial 91% grade, containing 9% water; this of course supplied water to the reaction mass. Additional moisture was present in the reaction mass from the moisture normally present in the starch.

In every one of the above examples, the final product was a solution of the starch derivative. Whenever desired, of course, the solution could be brought to a neutral pH by addition of suitable amounts of an acid. When coated upon a surface such as paper, synthetic film (e.g. cellophane, cellulose acetate, polyethylene, terephthalate ester, etc.) and dried, the resulting dry film could subsequently be made adhesively tacky by more moistening with water, or with suitable organic solvent, or by application of heat. When I chose to spray dry the dispersions, or dry them in trays in a forced draft oven, the resulting dry product was found to be readily redispersible in either water or suitable polar solvents such as many low molecular weight aliphatic alcohols, or cyclic ethers such as dioxane.

The examples herein shown are purely by way of illustration. Many variations in procedures and materials will be apparent to the person skilled in the art, without departing from the scope of the invention, which is limited only as shown in the following claims.

I claim:

1. A method for making a water-soluble and alcohol-soluble thermoplastic derivative of starch, comprising suspending starch in a liquid medium containing an alkaline etherification catalyst, and reacting said suspended starch at a temperature from 30°–90° C. with at least 100%, based on the dry weight of the starch, of an aliphatic alkylene oxide containing from 2 to 5 carbon atoms, said liquid medium being one in which the starch derivative resulting from said reaction is soluble and consisting essentially of a mixture of water and a polar organic solvent selected from the class consisting of low molecular weight aliphatic secondary and tertiary alcohols and cyclic ethers.

2. The method of claim 1 in which the etherification catalyst is an alkaline material selected from the class consisting of alkali metal hydroxides, triethylamine, pyridine and quaternary ammonium bases.

3. The method of claim 1 in which the alkylene oxide is propylene oxide and the polar organic solvent is isopropanol.

4. A method for making a water-soluble and alcohol-soluble thermoplastic derivative of starch, comprising suspending starch in a liquid medium containing an alkaline etherification catalyst and a free radical initiating catalyst, and reacting said suspended starch at a temperature from 30°–90° C. with at least 100%, based on the dry weight of the starch, of an aliphatic alkylene oxide containing from 2 to 5 carbon atoms, said liquid medium being one in which the starch derivative resulting from said reaction is soluble and consisting essentially of a mixture of water and a polar organic solvent selected from the class consisting of low molecular weight aliphatic secondary and tertiary alcohols and cyclic ethers.

5. The method of claim 4 in which the alkaline etherification catalyst is selected from the class consisting of alkali metal hydroxides, triethylamine, pyridine, and quaternary ammonium bases.

6. The method of claim 4 in which the free radical initiating catalyst is selected from the class consisting of azo compounds, persulfates, and peroxides.

7. The method of claim 4 in which the alkylene oxide is propylene oxide, the polar organic solvent is isopropanol, and the free radical initiating catalyst is hydrogen peroxide.

8. The method of claim 4 in which the amount of alkaline etherification catalyst is from 2% to 12% calculated as NaOH, and the amount of the free radical initiating catalyst is from 0.05% to 3.2%, both based on the dry weight of the starch.

9. A method for making a water-soluble and alcohol-soluble thermoplastic derivative of starch, comprising suspending starch in isopropanol, said suspension containing from 10% to 50% of water, and also containing an alkaline etherification catalyst, adding at least 100%, based on the dry weight of the starch, of an aliphatic alkylene oxide containing from 2 to 5 carbon atoms, heating the suspension to the reflux temperature of the alkylene oxide, adding a free radical initiating catalyst, and continuing heating at said reflux temperature until reflux ceases.

10. A colloidal solution of a water-soluble, alcohol-soluble, thermoplastic starch derivative, said solution being the reaction product resulting from suspending starch in water containing from 5% to 50% of a polar organic solvent, based on the dry weight of the starch, and containing an alkaline etherification catalyst and reacting said suspended starch at a temperature from 30°–90° C. with at least 100%, based on the dry weight of the starch, of an aliphatic alkylene oxide containing from 2 to 5 carbon atoms, said polar organic solvent being selected from the class consisting of low molecular weight aliphatic secondary and tertiary alcohols and cyclic ethers.

11. A solution of a water-soluble, alcohol-soluble, thermoplastic starch derivative in a polar organic solvent, said solution being the reaction product resulting from suspending starch in a polar organic solvent selected from the class consisting of low molecular weight aliphatic secondary and tertiary alcohols and cyclic ethers, said suspension containing from 10% to 50% of water, based on the dry weight of the starch, and also containing an alkaline etherification catalyst, adding at least 100%, based on the dry weight of the starch, of an aliphatic alkylene oxide containing from 2 to 5 carbon atoms, heating the suspension to the reflux temperature of the alkylene oxide, adding a free radical initiating catalyst, and continuing heating at said reflux temperature until reflux ceases.

References Cited in the file of this patent

UNITED STATES PATENTS

| | | |
|---|---|---|
| 2,669,523 | Kerr et al. | Feb. 16, 1954 |
| 2,733,238 | Kerr et al. | Jan. 31, 1956 |
| 2,744,894 | Benedict et al. | May 8, 1956 |